United States Patent
Tateno

(10) Patent No.: US 11,334,379 B2
(45) Date of Patent: May 17, 2022

(54) CONTROL DEVICE

(71) Applicants: Kabushiki Kaisha Toshiba, Tokyo (JP); Toshiba Infrastructure Systems and Solutions Corporation, Kanagawa (JP)

(72) Inventor: Genki Tateno, Tokyo (JP)

(73) Assignees: Kabushiki Kaisha Toshiba, Tokyo (JP); Toshiba Infrastructure Systems & Solutions Corporation, Kanagawa (JP)

(*) Notice: Subject to any disclaimer, the term of this patent is extended or adjusted under 35 U.S.C. 154(b) by 455 days.

(21) Appl. No.: 16/488,057

(22) PCT Filed: Dec. 27, 2017

(86) PCT No.: PCT/JP2017/047005
§ 371 (c)(1),
(2) Date: Aug. 22, 2019

(87) PCT Pub. No.: WO2018/154967
PCT Pub. Date: Aug. 30, 2018

(65) Prior Publication Data
US 2020/0249976 A1  Aug. 6, 2020

(30) Foreign Application Priority Data
Feb. 24, 2017 (JP) .............................. JP2017-033823

(51) Int. Cl.
*G06F 9/455* (2018.01)
*G06F 11/07* (2006.01)

(52) U.S. Cl.
CPC ...... *G06F 9/45558* (2013.01); *G06F 11/0712* (2013.01); *G06F 11/0751* (2013.01)

(58) Field of Classification Search
CPC ............ G06F 11/0712; G06F 11/0751; G06F 3/0689; G06F 9/455; G06F 9/45558; G06F 9/5011; G06F 9/5077
See application file for complete search history.

(56) References Cited

U.S. PATENT DOCUMENTS

2011/0004791 A1   1/2011  Kokubu et al.
2013/0160005 A1*  6/2013  Jung ................... G06F 9/45558
                                                                 718/1

(Continued)

FOREIGN PATENT DOCUMENTS

JP    2015-138525 A    7/2015
JP    2016-184373 A    10/2016

(Continued)

*Primary Examiner* — Joseph R Kudirka
(74) *Attorney, Agent, or Firm* — Baker Botts L.L.P.

(57) ABSTRACT

A control device according to an embodiment includes hardware. The hardware includes a memory and a processor. The memory stores a host operating system (OS), a virtual machine, a guest OS, a guest process, and a controller process. The virtual machine is implemented on the host OS. The guest OS operates on the virtual machine. The guest process unit is operated by the guest OS, and executes control processing for an external appliance to be controlled using the hardware that is allocated to the guest OS in accordance with hardware allocation data indicating hardware to be allocated to each of the host OS and the guest OS. The controller process unit is operated by the host OS, and executes control processing for the appliance to be controlled using the hardware that is allocated to the host OS in accordance with the hardware allocation data.

5 Claims, 13 Drawing Sheets

(56) References Cited

U.S. PATENT DOCUMENTS

| | | |
|---|---|---|
| 2016/0283276 A1 | 9/2016 | Enomoto et al. |
| 2017/0004081 A1 | 1/2017 | Hayakawa et al. |
| 2017/0068235 A1 | 3/2017 | Manabe et al. |

FOREIGN PATENT DOCUMENTS

| | | |
|---|---|---|
| WO | 2009/110111 A1 | 11/2009 |
| WO | 2015/132941 A1 | 9/2015 |
| WO | 2015/137505 A1 | 9/2015 |
| WO | 2016/189689 A1 | 12/2016 |

\* cited by examiner

FIG.3

| No. | OS | CPU (NUMBER OF CORES) | MEMORY | BUILT-IN LAN PORT | BUILT-IN USB PORT | EXPANSION PCI SLOT 1 | EXPANSION PCI SLOT 2 | ... |
|---|---|---|---|---|---|---|---|---|
| 1 | HOST OS | 3 | 4GB | EXCLUSIVE | SHARED | - | - | ... |
| 2 | GUEST OS | 1 | 4GB | - | SHARED | EXCLUSIVE | EXCLUSIVE | ... |
| ... | | | | | | | | |

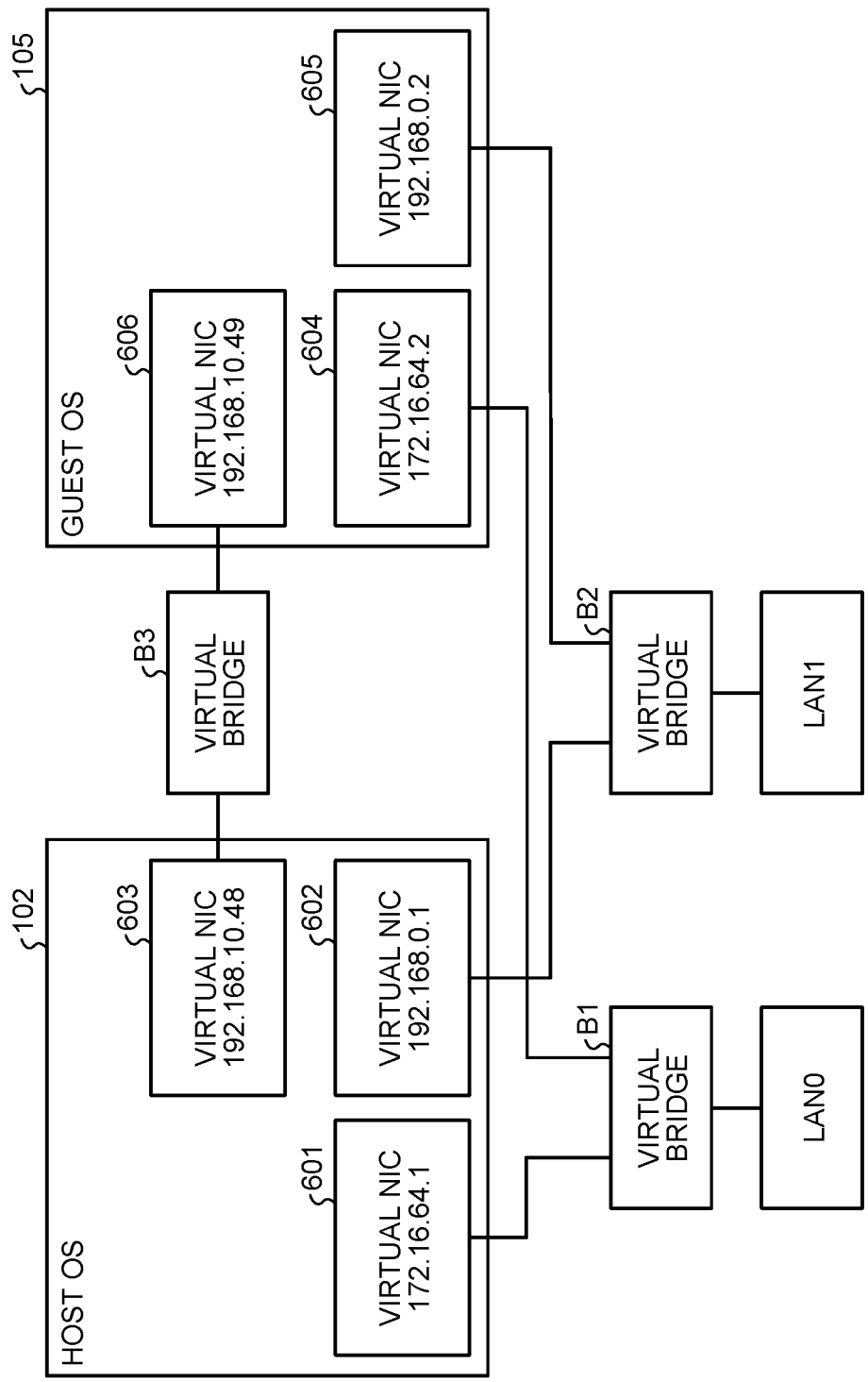

FIG.7

| NAME OF ITEM | OPTIONAL ITEM |
|---|---|
| TRANSPORT INFORMATION | YES/NO |
| VIRTUAL NETWORK USE INFORMATION | YES/NO |
| PORT NUMBER | 49152~65535 |
| IP ADDRESS OF HOST OS | OPTIONAL |
| IP ADDRESS OF GUEST OS | OPTIONAL |
| SUBNET MASK | OPTIONAL |
| SCANNING CYCLE | OPTIONAL |
| HOST TRANSMISSION OFFSET | DEPENDING ON MEMORY REGION OF HOST OS |
| HOST TRANSMISSION DATA SIZE | DEPENDING ON MEMORY REGION OF HOST OS |
| GUEST TRANSMISSION OFFSET | DEPENDING ON MEMORY REGION OF GUEST OS |
| GUEST TRANSMISSION DATA SIZE | DEPENDING ON MEMORY REGION OF GUEST OS |

CONTROL DEVICE

FIELD

Embodiments of the present invention relate to a control device.

BACKGROUND

There is known a technique called server virtualization, the technique of logically dividing one computer to operate a plurality of operating systems (OSs) on the computer. If this technique can be applied to a control system for controlling an appliance to be controlled such as a valve in a plant, a plurality of devices can be integrated into one computer, the devices being related to control of the appliance to be controlled such as a human machine interface (HMI), a PC for tools, and a controller. Due to this, a great effect can be expected in reducing introduction cost for facilities, and cost for electric power or air conditioning of the control system.

CITATION LIST

Patent Literature

Patent Literature 1: WO2016/189689
Patent Literature 2: WO2015/137505

SUMMARY OF THE INVENTION

Problem to be Solved by the Invention

In a case in which hardware such as an HMI, a PC for tools, and a controller is updated, the control system is required to maintain existing functions of the HMI, the PC for tools, the controller, and the like, and how to manage allocation of the hardware for a guest OS is a problem.

Means for Solving Problem

A control device according to an embodiment includes hardware, a host operating system (OS), a virtual machine, a guest OS, a guest process unit, and a controller process unit. The virtual machine is implemented on the host OS. The guest OS operates on the virtual machine. The guest process unit is operated by the guest OS, and executes control processing for an external appliance to be controlled using the hardware that is allocated to the guest OS in accordance with hardware allocation data indicating hardware to be allocated to each of the host OS and the guest OS. The controller process unit is operated by the host OS, and executes control processing for the appliance to be controlled using the hardware that is allocated to the host OS in accordance with the hardware allocation data.

BRIEF DESCRIPTION OF DRAWINGS

FIG. 3 is a diagram illustrating an example of hardware allocation data downloaded by a control device according to the first embodiment.

FIG. 6 is a diagram for explaining an example of communication processing between a host OS and a guest OS executed by the controller according to the second embodiment.

FIG. 7 is a diagram illustrating an example of communication parameters included in hardware allocation data downloaded by the controller according to the second embodiment.

DETAILED DESCRIPTION

The following describes a control system to which a control device according to the present embodiments is applied, with reference to the attached drawings.

First Embodiment

Figure 1:
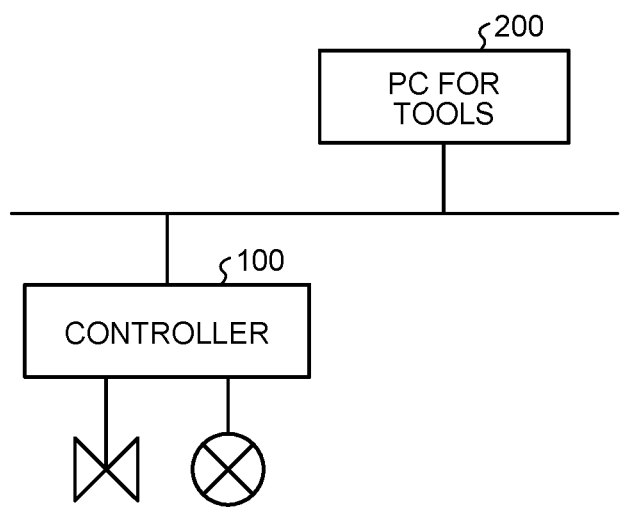
FIG. 1 is a diagram illustrating an example of a functional configuration of a control system according to a first embodiment.

FIG. 1 is a diagram illustrating an example of a functional configuration of a control system according to a first embodiment. As illustrated in FIG. 1, the control system according to the present embodiment includes a controller 100 and a PC for tools 200. The controller 100 and the PC for tools 200 are connected to each other in a communicable manner via a network such as a local area network (LAN).

The PC for tools 200 is used by a vendor, an engineer, or the like, and stores a program organization unit (POU), hardware allocation data (tool data) (described later), and the like. The POU is a computer program obtained by modularizing, in units of function, a computer program for executing processing for the entire control system.

The controller 100 receives inputs of various detection results from a sensor and the like in a plant. The POU created by the PC for tools 200 is downloaded into the controller 100. The controller 100 executes the POU on a task in the controller 100. Due to this, the controller 100 performs an arithmetic operation based on an input detection result, and controls an appliance to be controlled such as a valve in the plant based on an arithmetic result.

The controller 100 functions as an example of a control device in which resource (hardware) of the controller 100 is logically divided to operate a plurality of operation systems (OSs) by the controller 100, and external devices related to the control of the appliance to be controlled such as a human machine interface (HMI) and another controller included in the control system are integrated. The HMI is used by an operator of the control system for remotely monitoring a state and the like of the POU executed by the controller 100, or performing various operations such as writing a variable into the controller 100 or changing execution of the POU.

Figure 2:
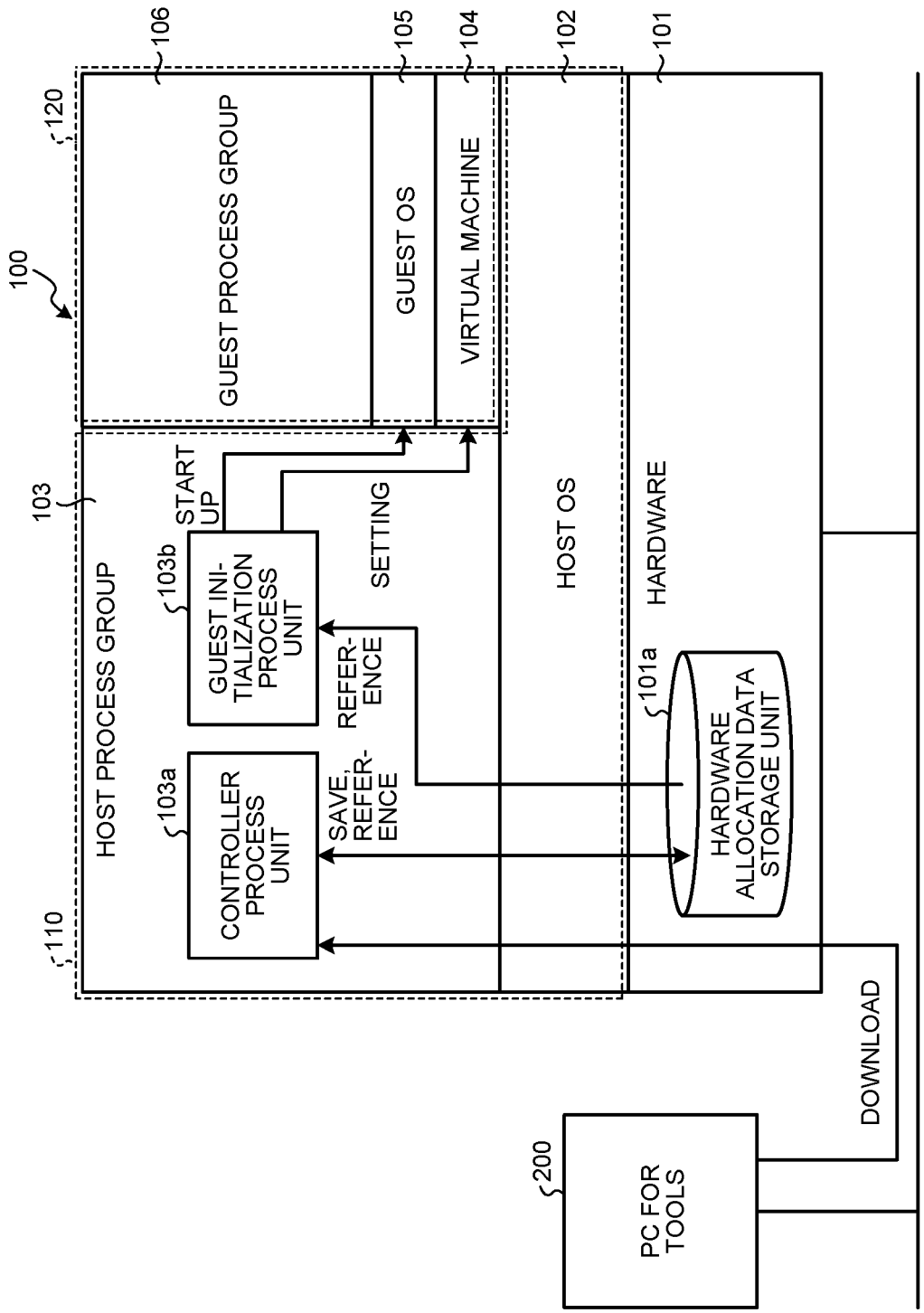
FIG. 2 is a diagram illustrating an example of a functional configuration of a controller included in the control system according to the first embodiment.

FIG. 2 is a diagram illustrating an example of a functional configuration of the controller included in the control system according to the first embodiment. As illustrated in FIG. 2, the controller 100 includes hardware 101, a host OS 102, a host process group 103, a virtual machine (virtualization layer) 104, a guest OS 105, and a guest process group 106. The hardware 101 is, for example, a processor such as a central processing unit (CPU), a memory such as a read only memory (ROM) or a random access memory (RAM), a LAN port used for communicating with the PC for tools 200 and the like, a universal serial bus (USB) port, and a PCI slot. In the present embodiment, the controller 100 is a multicore processor that includes a plurality of CPU cores (for example, four CPU cores) as the hardware 101, and executes software on the CPU cores. Specifically, the controller 100 causes a plurality of containers 110 and 120 separated from each other to operate by one OS (host OS 102) executed by any of the CPU cores. In this case, the controller 100 executes the respective containers by different CPU cores. In the present embodiment, as illustrated in FIG. 2, the controller 100 executes the container 110 including the host OS 102 and the host process group 103, and the container 120 including the virtual machine 104, the guest OS 105, and the guest process group 106 by different CPU cores.

The host OS 102 is an OS that allows an external device (virtual machine 104) virtualized by the controller 100 to be implemented. The host process group 103 includes an application that operates on the host OS 102. The virtual machine 104 is implemented on the host OS 102. In the present embodiment, the virtual machine 104 is a machine obtained by virtualizing hardware of the external device such as an HMI and another controller. In this case, virtualization includes emulation of the hardware of the external device. The guest OS 105 is an OS that operates on the virtual machine 104, and operates a computer program (the guest process group 106 described later) of the external device. The guest process group 106 is operated by the guest OS 105, and executes processing related to the control of the appliance to be controlled (hereinafter, referred to as control processing) using the hardware 101 that is allocated to the guest OS 105 in accordance with hardware allocation data (described later). In a case in which the virtual machine 104 is a machine obtained by virtualizing the HMI, the control processing includes processing related to monitoring of the control system and a remote operation of a process executed by the control system. In a case in which the virtual machine 104 is a machine obtained by virtualizing another controller, the control processing includes processing of controlling the appliance to be controlled by transmitting control data to the appliance to be controlled, for example.

In the present embodiment, the host process group 103 includes a controller process unit 103a. The controller process unit 103a is operated by the host OS 102 not via the guest OS 105. The POU is downloaded from the PC for tools 200 into the controller process unit 103a, and the controller process unit 103a executes the POU. The hardware allocation data is downloaded from the PC for tools 200 (an example of an external storage device) into the controller process unit 103a, and the controller process unit 103a executes control processing related to the control of the appliance to be controlled by the hardware 101 that is allocated to the host OS 102 in accordance with the hardware allocation data. In this case, the hardware allocation data is data indicating the hardware 101 to be allocated to each of the host OS 102 and the guest OS 105. Specifically, in a case in which a power supply of the controller 100 is turned ON, the controller process unit 103a validates the hardware allocation data, and controls the appliance to be controlled using the hardware 101 allocated to the host OS 102 indicated by the hardware allocation data. The controller process unit 103a also saves the downloaded hardware allocation data in a hardware allocation data storage unit 101a as a nonvolatile storage unit such as a hard disk drive (HDD) included in the hardware 101.

In view of management of engineering data in the control system, it is preferable to manage the hardware 101 allocated to the guest OS 105 in accordance with the hardware allocation data. Thus, in the present embodiment, as illustrated in FIG. 2, the host process group 103 includes a guest initialization process unit 103b in addition to the controller process unit 103a. At the time when the power supply of the controller 100 is turned ON, the guest initialization process unit 103b refers to the hardware allocation data, allocates the hardware 101 to the guest OS 105, and sets, on the host OS 102, the virtual machine 104 obtained by virtualizing (emulating, reconstructing) the external device. The guest initialization process unit 103b also starts up the guest OS 105 on the virtual machine 104. Due to this, the hardware 101 can be set (allocated) to the guest OS 105 operating on the virtual machine 104 by a method similar to the method of setting (allocating) the hardware 101 to the host OS 102, so that, even in a case in which the external device such as the HMI and another controller is integrated into the controller 100, setting (allocation) of the hardware 101 to the guest OS 105 can be easily managed in accordance with update of the hardware 101.

FIG. 3 is a diagram illustrating an example of the hardware allocation data downloaded by the control device according to the first embodiment. As illustrated in FIG. 3, the hardware allocation data represents, in association with each of the host OS 102 and the guest OS 105, the number of CPU cores allocated to each of the host OS 102 and the guest OS 105 (in the present embodiment, the number of CPU cores allocated to each of the host OS 102 and the guest OS 105 among the four CPU cores), capacity of a memory allocated to each OS, a use of a built-in LAN port allocated to each OS ("exclusive", "shared", or "-"), a use of a built-in USB port allocated to each OS ("exclusive", "shared", or "-"), and a use of expansion PCI slots 1 and 2 allocated to each OS ("exclusive", "shared", or "-"). In FIG. 3, regarding the use of the built-in LAN port, the built-in USB port, and the expansion PCI slots 1 and 2 allocated to each OS, "exclusive" represents that they are used for only one OS, "shared" represents that they are used for a plurality of OSs, and "-" represents that they are not used by any of the OSs.

In a case of downloading the hardware allocation data illustrated in FIG. 3, the controller process unit 103a executes control processing using three CPU cores, a memory of 4 GB, the built-in LAN port, and the built-in USB port that are allocated to the host OS 102. In a case of downloading the hardware allocation data illustrated in FIG. 3, the guest initialization process unit 103b allocates one CPU core, the memory of 4 GB, the built-in USB port, and the expansion PCI slots 1 and 2 to the guest OS 105. Subsequently, the host OS 102 starts up the virtual machine 104 obtained by virtualizing the external device. The guest initialization process unit 103b also starts up the guest OS 105 on the virtual machine 104. The guest process group 106 then executes control processing using the hardware 101 such as one CPU core, the memory of 4 GB, the built-in USB port, and the expansion PCI slots 1 and 2 that are allocated to the guest OS 105.

In this way, with the controller 100 according to the first embodiment, the hardware 101 can be allocated to the guest OS 105 by a method similar to the method of allocating the hardware 101 to the host OS 102, so that, even in a case in which the external device such as the HMI and another controller is integrated into the controller 100, the external device can be easily reconstructed by the controller 100, and allocation of the hardware 101 to the guest OS 105 can be easily managed in accordance with the update of the hardware 101.

Second Embodiment

The present embodiment is an example of implementing processing of sharing the control data between the controller and the external device also for the controller process unit and the guest process group. In the following description, redundant description about a configuration similar to that of the first embodiment will not be repeated.

Figure 4:
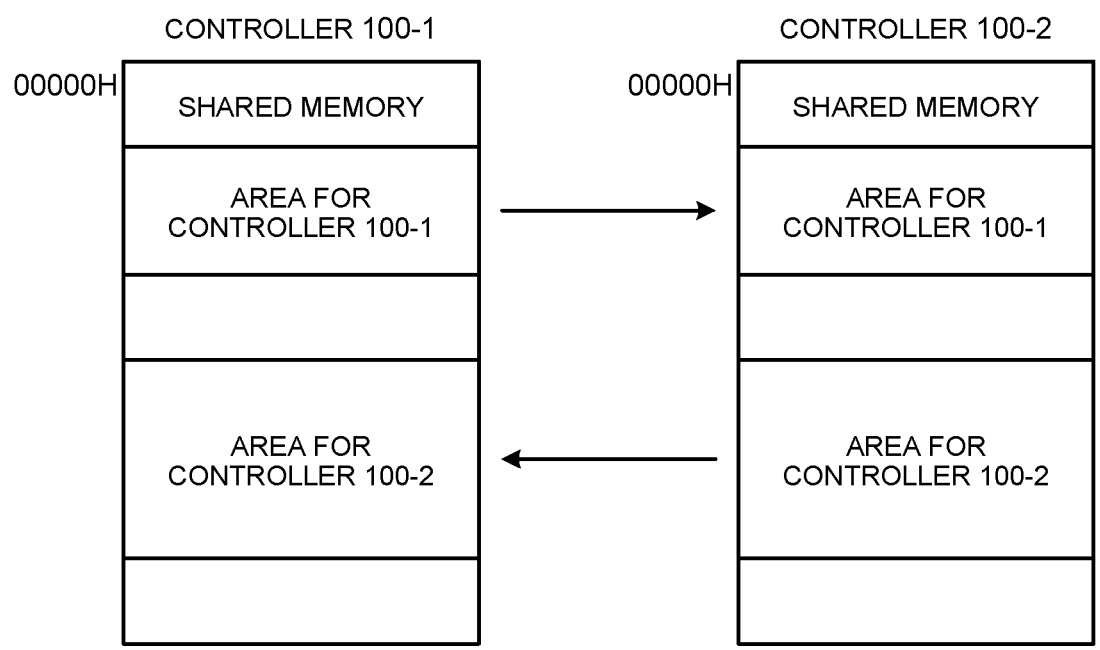
FIG. 4 is a diagram for explaining an example of processing of sharing control data between controllers in a conventional control system.

FIG. 4 is a diagram for explaining an example of processing of sharing the control data between controllers in a conventional control system. As illustrated in FIG. 4, a controller 100-1 in the control system periodically transmits, to another controller 100-2, control data stored in a storage region allocated to the controller 100-1 (area for the controller 100-1) in a shared memory included in the controller 100-1 via a network such as a LAN. In this case, the control data is data related to the control of the appliance to be controlled. When receiving the control data from the controller 100-1, the controller 100-2 writes the received control data into a storage region allocated to the controller 100-1 (area for the controller 100-1) in a shared memory included in the controller 100-2. Due to this, the control data is shared by the entire control system.

As illustrated in FIG. 4, the controller 100-2 in the control system periodically transmits, to the other controller 100-1, the control data stored in a storage region allocated to the controller 100-2 (area for the controller 100-2) in the shared memory included in the controller 100-2 via a network such as a LAN. When receiving the control data from the controller 100-2, the controller 100-1 writes the received control data into the storage region allocated to the controller 100-2 (area for the controller 100-2) in the shared memory included in the controller 100-1. Due to this, the control data is shared by the entire control system.

Figure 5:
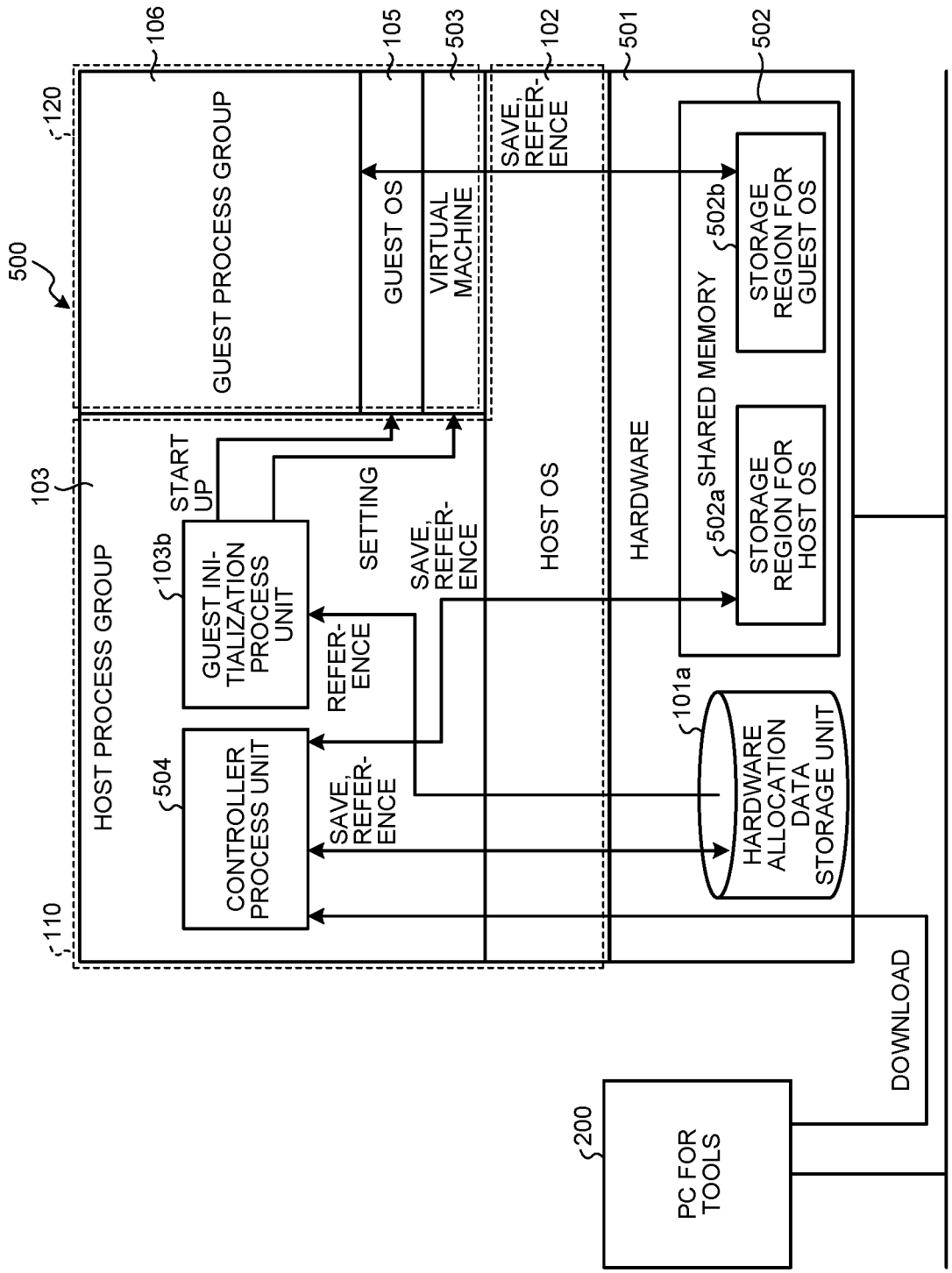
FIG. 5 is a diagram illustrating an example of a functional configuration of a controller included in a control system according to a second embodiment.

FIG. 5 is a diagram illustrating an example of a functional configuration of the controller included in the control system according to the second embodiment. In the present embodiment, processing of sharing the control data between a controller process unit 504 and the guest process group 106 is executed in a case in which the external device related to the control of the appliance to be controlled is integrated into a controller 500. Thus, as illustrated in FIG. 5, hardware 501 includes a shared memory 502 to be allocated to each of the host OS 102 and the guest OS 105, and including a plurality of storage regions for storing the control data shared between the host OS 102 and the guest OS 105. Specifically, as illustrated in FIG. 5, the hardware 501 includes the shared memory 502 including a storage region 502a allocated to the host OS 102 (hereinafter, referred to as a storage region for the host OS) and a storage region 502b allocated to the guest OS 105 (hereinafter, referred to as a storage region for the guest OS).

In the present embodiment, the host OS 102 allows a virtual machine 503 including a virtual bridge that enables communication between the host OS 102 and the guest OS 105 to be implemented. Due to this, the host OS 102 can communicate with the guest OS 105 via the virtual bridge included in the virtual machine 503. The controller process unit 504 saves the control data in the storage region 502a for the host OS, and transmits/receives the control data to/from the guest process group 106 via the virtual bridge. A guest process group 505 saves the control data in the storage region 502b for the guest OS, and transmits/receives the control data to/from the controller process unit 504 via the virtual bridge. Due to this, the control data can be also shared between the host OS 102 and the guest OS 105.

FIG. 6 is a diagram for explaining an example of communication processing between the host OS and the guest OS performed by the controller according to the second embodiment. In FIG. 6, each of LANs 0 and 1 represents a physical input/output port included in the hardware 501 of the controller 500. In the present embodiment, the host OS 102 allows the virtual machine 503 including virtual bridges B1, B2, and B3, and virtual NICs 601 to 606 to be implemented. The virtual bridges B1 and B2 are shared by the host OS 102 and the guest OS 105. The virtual NICs 601, 602, and 603 are allocated to the host OS 102. The virtual NICs 604, 605, and 606 are allocated to the guest OS 105.

The host OS 102 can communicate with the outside via the virtual NIC 601, the virtual bridge B1, and the LAN 0. The host OS 102 can communicate with the outside via the virtual NIC 602, the virtual bridge B2, and the LAN 1. On the other hand, the guest OS 105 can communicate with the outside via the virtual NIC 604, the virtual bridge B1, and the LAN 0. The guest OS 105 can also communicate with the outside via the virtual NIC 605, the virtual bridge B2, and the LAN 1. Thus, the host OS 102 and the guest OS 105 can communicate with each other by being connected to each other via the virtual bridges B1 and B2.

The host OS 102 and the guest OS 105 may be communicable with each other by connecting the virtual NICs 603 and 606 allocated thereto via the virtual bridge B3. The host OS 102 and the guest OS 105 may communicate with each other by any of the communication methods described above.

That is, in the present embodiment, the host OS 102 can communicate with the external device including the guest OS 105 using the virtual NICs 601 to 603 (virtual network cards) allocated to the host OS 102 via the virtual bridges B1, B2, and B3. The guest OS 105 can communicate with the external device including the host OS 102 using the virtual NICs 604 to 606 (virtual network cards) allocated to the guest OS 105 via the virtual bridges B1, B2, and B3.

Parameters required for communication with the external device performed by the host OS 102 and the guest OS 105 (hereinafter, referred to as communication parameters) are also required to be managed by the PC for tools 200 in view of maintainability. In this case, the host OS 102 can communicate with the PC for tools 200, so that the host OS 102 can communicate with the external device by referring to the communication parameters. However, the guest OS 105 requires a mechanism for referring to the communication parameters in a case of being unable to communicate with the PC for tools 200.

Thus, in the present embodiment, the controller process unit 504 downloads the hardware allocation data including the communication parameters from the PC for tools 200. The guest initialization process unit 103b saves the communication parameters included in the downloaded hardware allocation data in a memory or the like included in the hardware 101 allocated to the guest OS 105, so that the guest process group 106 can refer to the communication parameters.

FIG. 7 is a diagram illustrating an example of the communication parameters included in the hardware allocation data downloaded by the controller according to the second embodiment. As illustrated in FIG. 7, in the present embodiment, the communication parameters include transport information, virtual network use information, a port number, an IP address allocated to the host OS 102 (controller 100), an IP address allocated to the guest OS 105, a subnet mask, a scanning cycle, a host transmission offset, a host transmission data size, a guest transmission offset, and a guest transmission data size. In the present embodiment, the communication parameters include the transport information and the virtual network use information, but the communication parameters may include at least the port number, the IP address allocated to the host OS 102, the IP address allocated to the guest OS 105, the subnet mask, the scanning cycle, the host transmission offset, the host transmission data size, the guest transmission offset, and the guest transmission data size.

The transport information indicates whether the control data (transmission/reception, transport) is shared between the controller process unit 504 operating on the host OS 102 and the guest process group 106 operating on the guest OS 105. The virtual network use information indicates whether the control data is transported between the controller process unit 504 operating on the host OS 102 and the guest process group 106 operating on the guest OS 105 via a virtual network in a case in which the transport information indicates that the control data is shared by transporting. The port number is a number of a port used for communication by the host OS 102 and the guest OS 105. The subnet mask is a subnet mask of the IP address of each of the host OS 102 and the guest OS 105. The scanning cycle is a cycle for transmitting/receiving the control data between the controller process unit 504 operating on the host OS 102 and the guest process group 106 operating on the guest OS 105. The host transmission offset is a head address (start address) of a storage region in which the control data to be transmitted from the controller process unit 504 to the guest process group 106 is saved among the storage regions included in the storage region 502a for the host OS in the shared memory 502. The host transmission data size is a size of the control data to be transmitted from the controller process unit 504 to the guest process group 106. The guest transmission offset is a head address (start address) of a storage region in which the control data to be transmitted from the guest process group 106 to the controller process unit 504 is saved among the storage regions included in the storage region 502b for the guest OS of the shared memory 502. The guest transmission data size is a size of the control data to be transmitted from the guest process group 106 to the controller process unit 504.

When the guest initialization process unit 103b enables the guest process group 106 to refer to the communication parameters, the controller process unit 504 and the guest process group 106 execute first sharing processing (an example of first processing, what is called shared memory communication) of transmitting/receiving the control data between the controller process unit 504 operating on the host OS 102 and the guest process group 106 operating on the guest OS 105 in accordance with the communication parameters that can be referred to. Specifically, the controller process unit 504 saves the control data in the storage region 502a for the host OS, and executes shared memory communication for transmitting/receiving the control data to/from the guest process group 106 in accordance with the communication parameters. The guest process group 106 saves the control data in the storage region 502b for the guest OS, and executes shared memory communication for transmitting/receiving the control data to/from the controller process unit 504 in accordance with the communication parameters. Due to this, even in a case in which the external device is integrated into the controller 100, the control data can be shared between the controller 100 and the virtual machine 104 obtained by virtualizing the external device.

Figure 8:
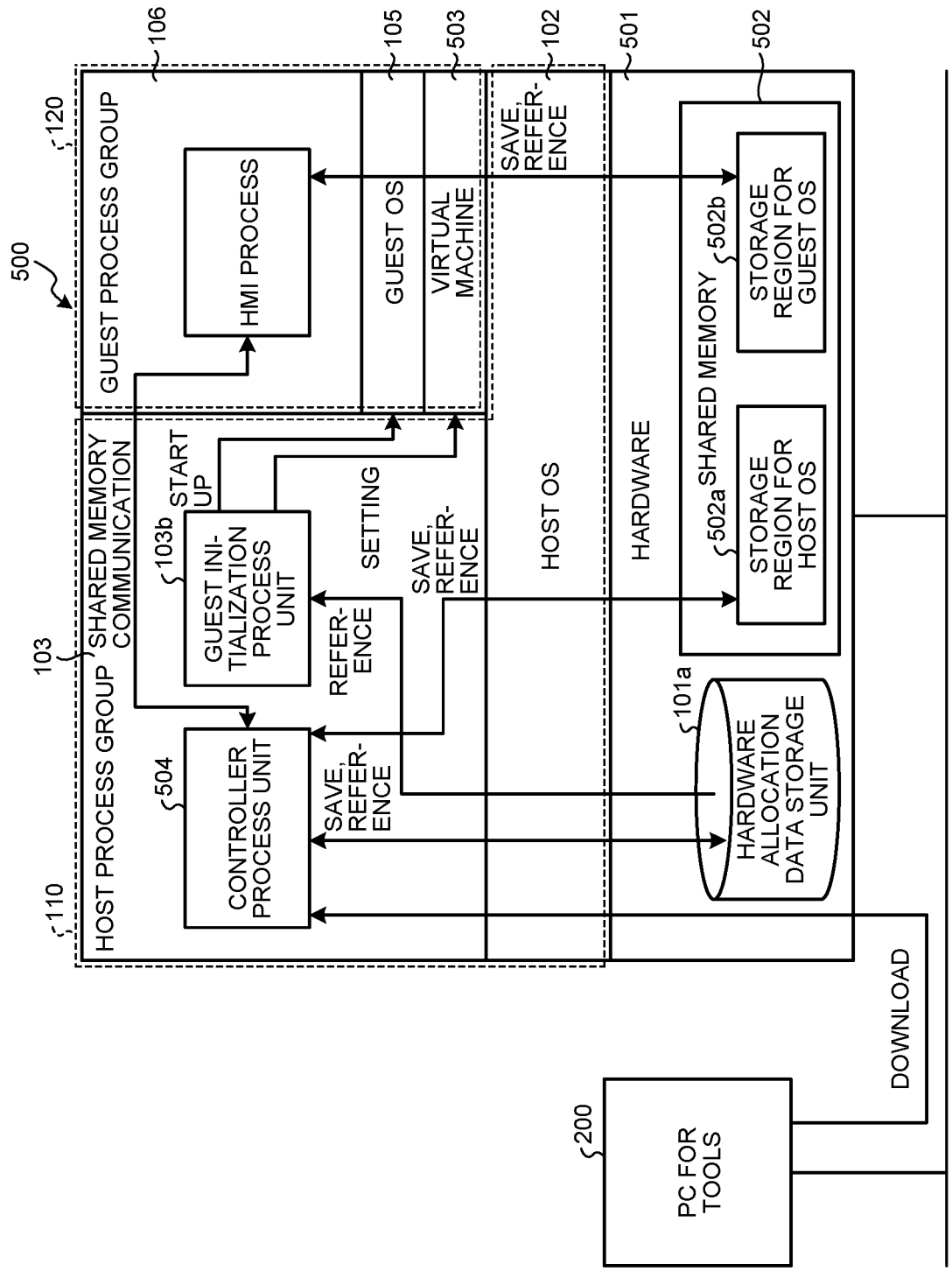
FIG. 8 is a diagram for explaining an example of sharing processing of control data executed by the control system according to the second embodiment.

FIG. 8 is a diagram for explaining an example of the sharing processing of the control data executed by the control system according to the second embodiment. As illustrated in FIG. 8, the controller process unit 504 can refer to the hardware allocation data downloaded from the PC for tools 200. On the other hand, in a case in which the guest process group 106 has the same function as that of the controller process unit 504 (the function of downloading the hardware allocation data), the guest process group 106 can refer to the hardware allocation data, but in a case in which processing executed by the guest process group 106 is processing executed by an HMI (HMI process), the guest process group 106 cannot refer to the hardware allocation data. In this case, before executing shared memory communication, the guest initialization process unit 103b executes communication parameter solving communication for notifying the guest process group 106 of the communication parameters included in the hardware allocation data downloaded from the PC for tools 200. The guest process group 106 saves the notified communication parameters in a memory (for example, the storage region 502b for the guest OS) and the like included in the hardware 501 allocated to the guest OS 105, so that the guest process group 106 can refer to the communication parameters. Due to this, as illustrated in FIG. 8, the guest process group 106 can refer to the communication parameters, and shared memory communication can be executed such that the control data is transmitted/received between the controller process unit 504 operating on the host OS 102 and the guest process group 106 operating on the guest OS 105.

In this way, with the controller 100 according to the second embodiment, the control data can be shared between the controller process unit 504 and the guest process group 106 even in a case in which the external device is integrated into the controller 100.

Third Embodiment

The present embodiment is an example of including a device memory that is allocated to the host OS and stores the control data to be transmitted from the controller process unit to the appliance to be controlled, and a driver that enables the guest process group to access the device memory. In this case, the guest process group accesses the control data stored in the device memory via a driver. In the following description, redundant description about a configuration similar to that of the second embodiment will not be repeated.

Figure 9:
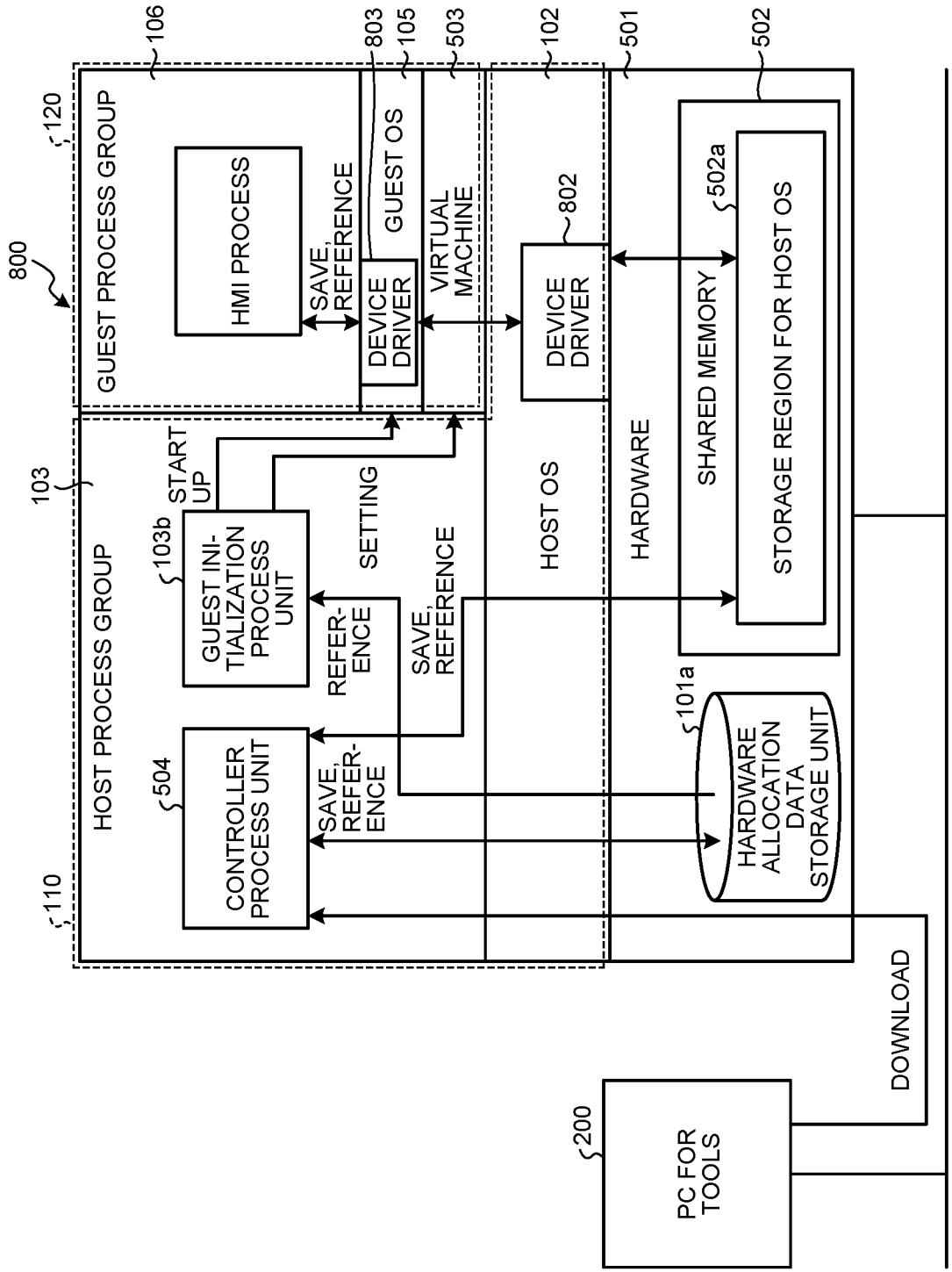
FIG. 9 is a diagram for explaining an example of sharing processing of control data executed by a control system according to a third embodiment.

FIG. 9 is a diagram for explaining an example of sharing processing of the control data executed by the control system according to a third embodiment. As illustrated in FIG. 9, the hardware 501 of a controller 800 includes a PCI device memory (in the present embodiment, the storage region 502a for the host OS) that is allocated to the host OS 102 and stores the control data to be transmitted from the controller process unit 504 to the appliance to be controlled. The host OS 102 includes a driver 802 (hereinafter, referred to as a device driver) that enables the guest process group 106 (for example, an HMI process executed by the HMI) to access the storage region 502a for the host OS as an example of the PCI device memory. The guest OS 105 includes a driver 803 (hereinafter, referred to as a device driver) that enables the guest process group 106 to access the storage region 502a for the host OS via the device driver 802. The guest process group 106 executes second sharing processing (an example of second processing) of saving the control data to be referred to in the storage region 502a for the host OS as an example of the PCI device memory via the device drivers 802 and 803.

Due to this, with the controller 800 according to the third embodiment, the control data is not required to be transmitted/received between the controller process unit 504 and the guest process group 106, so that the control data can be shared between the controller process unit 504 and the guest process group 106 without affecting existing functions related to a network load or a resource for communication.

Fourth Embodiment

The present embodiment is an example in which the controller process unit and the guest process group switch a method of sharing the control data between the controller process unit and the guest process group in accordance with the transport information included in the communication parameters. In the following description, redundant description about a configuration similar to that of the second and the third embodiments will not be repeated.

Figure 10:
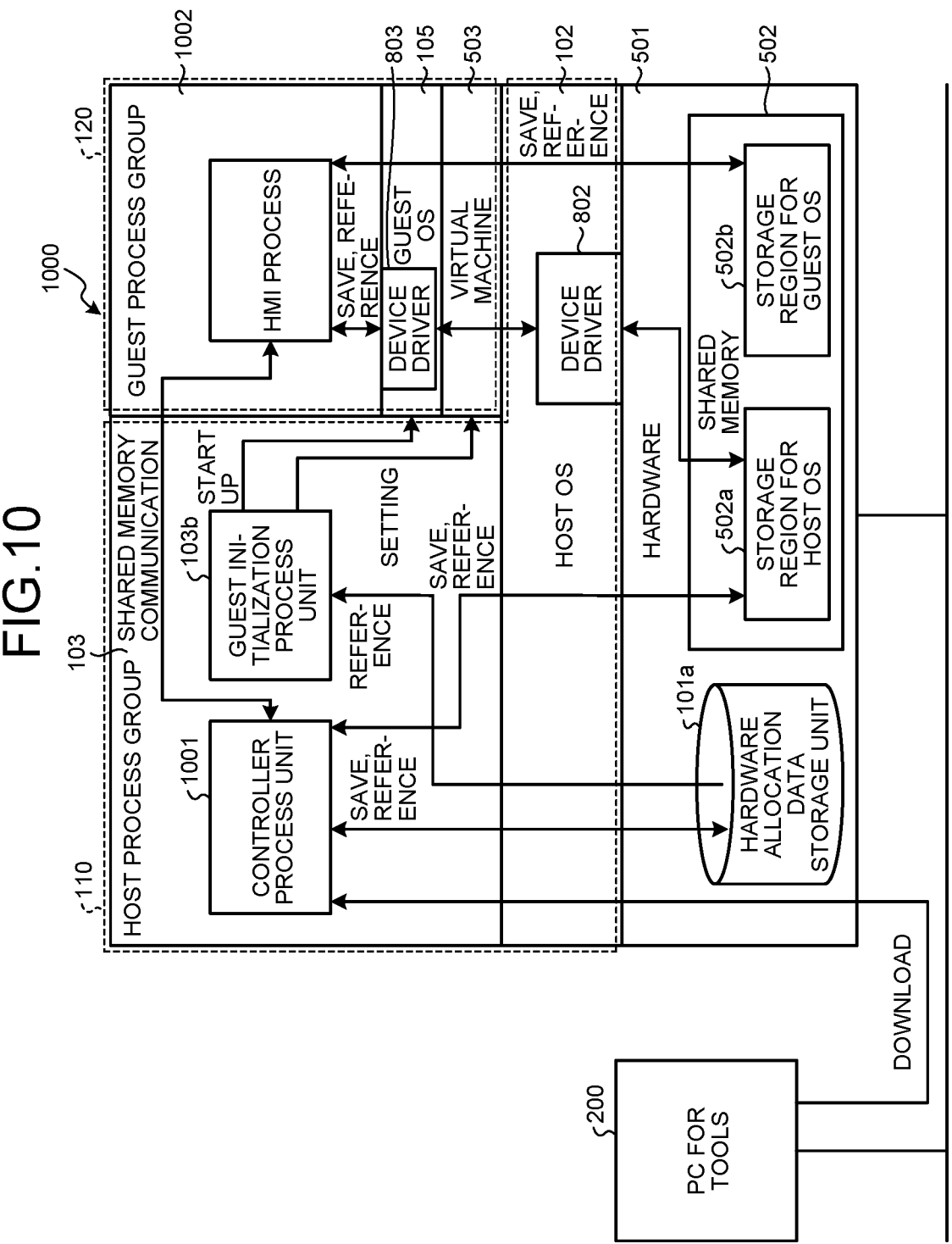
FIG. 10 is a diagram illustrating an example of a functional configuration of a controller included in a control system according to a fourth embodiment.

FIG. 10 is a diagram illustrating an example of a functional configuration of the controller included in the control system according to a fourth embodiment. A controller process unit 1001 included in a controller 1000 according to the present embodiment determines whether to share the control data by transporting based on the transport information included in the communication parameters. If it is determined to share the control data by transporting, similarly to the second embodiment, the controller process unit 1001 executes shared memory communication for saving the control data in the storage region 502a for the host OS, and transmitting/receiving the control data to/from a guest process group 1002. On the other hand, if it is determined not to share the control data by transporting, the controller process unit 1001 only saves the control data in the storage region 502a for the host OS.

The guest process group 1002 according to the present embodiment determines whether to share the control data by transporting based on the transport information included in the communication parameters. If it is determined to share the control data by transporting, similarly to the second embodiment, the guest process group 1002 executes shared memory communication for saving the control data in the storage region 502b for the guest OS, and transmitting/receiving the control data to/from the controller process unit 1001. On the other hand, if it is determined not to share the control data by transporting, the guest process group 1002 saves the control data in the storage region 502a for the host OS via the device driver 802, and refers to the control data.

Figure 11:
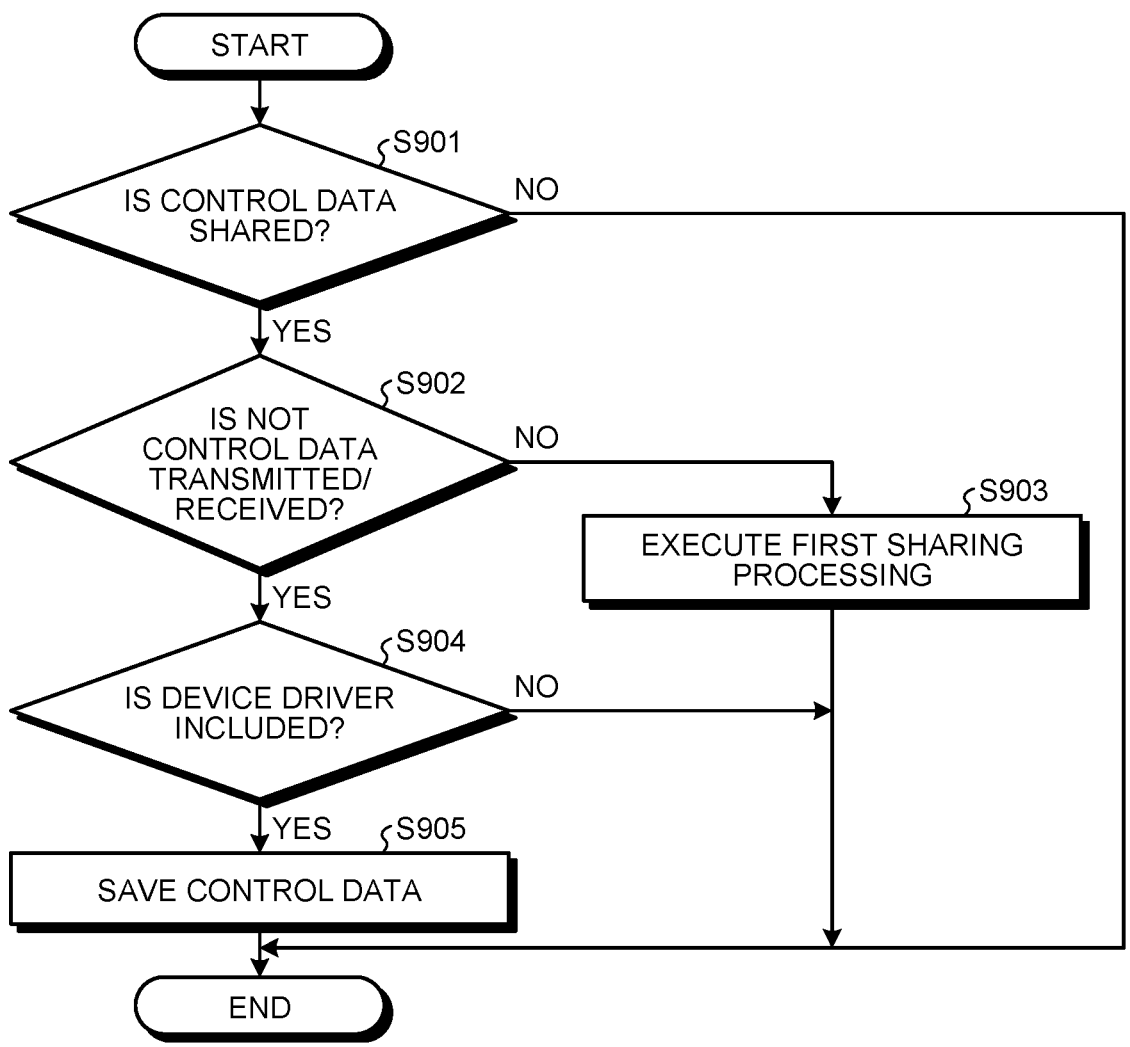
FIG. 11 is a flowchart illustrating an example of a processing procedure for sharing control data executed by a controller process unit of the control system according to the fourth embodiment.

FIG. 11 is a flowchart illustrating an example of a processing procedure for sharing the control data executed by the controller process unit of the control system according to the fourth embodiment. As illustrated in FIG. 10, the controller process unit 1001 determines whether to share the control data between the controller process unit 1001 and the guest process group 1002 (Step S901). In the present embodiment, it is assumed that whether to share the control data between the controller process unit 1001 and the guest process group 1002 is set in advance.

If it is determined to share the control data between the controller process unit 1001 and the guest process group 1002 (Yes at Step S901), the controller process unit 1001 determines whether to share the control data by transporting based on the transport information included in the communication parameters included in the hardware allocation data (Step S902). If it is determined to share the control data by transporting (No at Step S902), the controller process unit 1001 executes the first sharing processing of saving the control data in the storage region 502a for the host OS, and transmitting/receiving the control data to/from the guest process group 1002 (Step S903).

On the other hand, if it is determined not to share the control data by transporting (Yes at Step S902), the controller process unit 1001 determines whether the device driver 802 is included (Step S904). If the device driver 802 is included (Yes at Step S904), the controller process unit 1001 saves the control data in the storage region 502a for the host OS (Step S905). On the other hand, if the controller 1000 does not include the device driver 802 (No at Step S904), the controller process unit 1001 does not execute processing of sharing the control data with the guest process group 1002.

Figure 12:
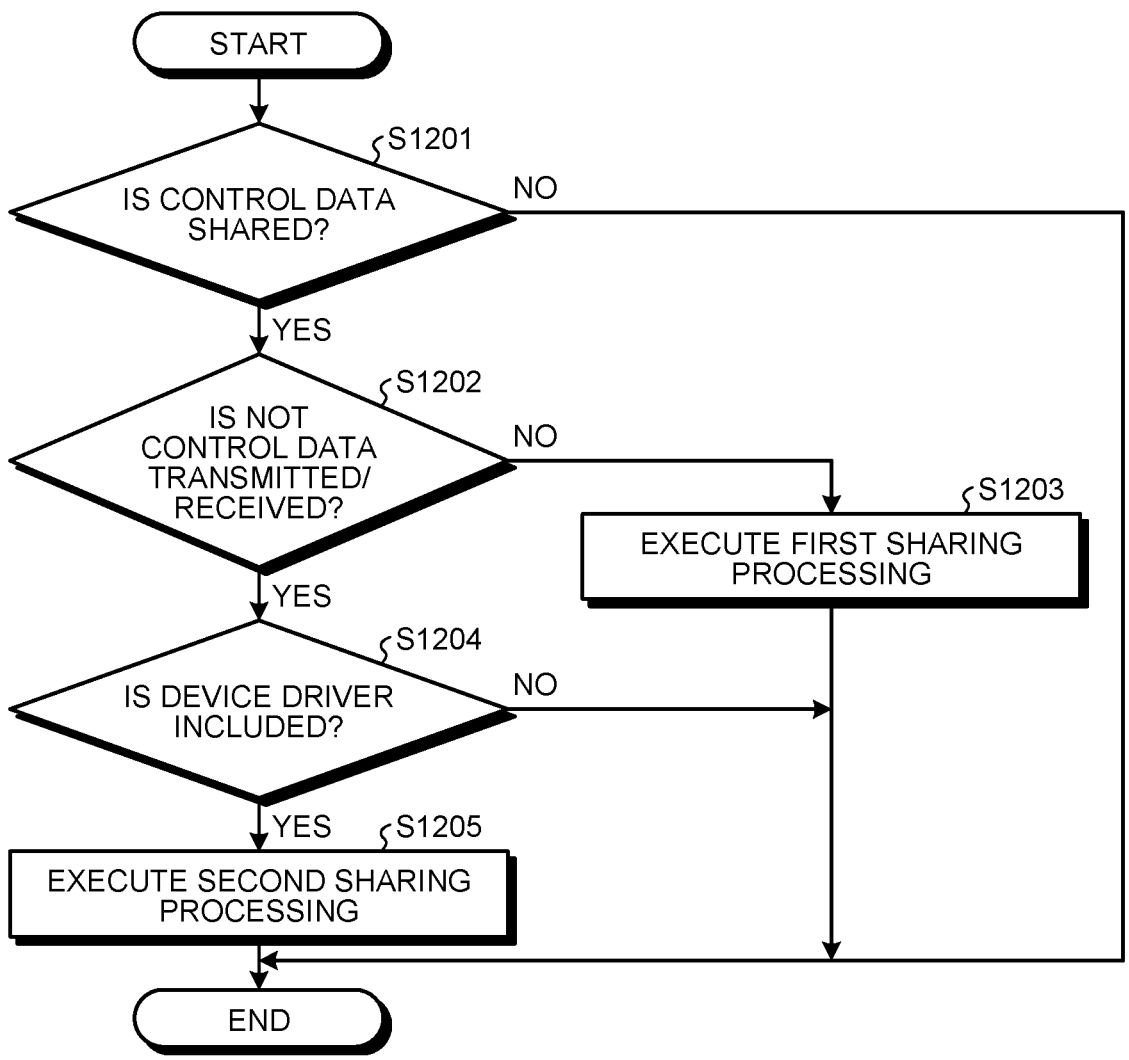
FIG. 12 is a flowchart illustrating an example of a processing procedure for sharing control data executed by a guest process group of the control system according to the fourth embodiment.

FIG. 12 is a flowchart illustrating an example of a processing procedure for sharing the control data executed by the guest process group of the control system according to the fourth embodiment. As illustrated in FIG. 12, the guest process group 1002 determines whether to share the control data between the controller process unit 1001 and the guest process group 1002 (Step S1201).

If it is determined that the control data is shared between the controller process unit 1001 and the guest process group 1002 (Yes at Step S1201), the guest process group 1002 determines whether to share the control data by transporting based on the transport information (Step S1202). If it is determined to share the control data by transporting (No at Step S1202), the guest process group 1002 executes the first sharing processing of saving the control data in the storage region 502b for the guest OS, and transmitting/receiving the control data to/from the controller process unit 1001 (Step S1203).

On the other hand, if it is determined not to share the control data by transporting (Yes at Step S1202), the guest process group 1002 determines whether the device driver 802 is included (Step S1204). If it is determined that the device driver 802 is not included (No at Step S1204), the guest process group 1002 does not execute the processing of sharing the control data with the controller process unit 1001. On the other hand, if it is determined that the device driver 802 is included (Yes at Step S1204), the guest process group 1002 executes the second sharing processing of saving the control data in the storage region 502a for the host OS via the device driver 802, and referring to the control data (Step S1205).

In this case, to execute the second sharing processing, the device driver 802 is required for the guest process group 1002 to access the control data stored in the storage region 502a for the host OS as an example of the PCI device memory. In a case in which the host OS 102 and the guest OS 105 will be upgraded in the future, it is assumed that the device driver 802 needs to be verified or modified each time of upgrading, and modification of the device driver 802 may be given up due to cost thereof. Thus, in the present embodiment, by selectably enabling the first sharing processing and the second sharing processing to be executed, the control data can be shared between the controller process unit 1001 and the guest process group 106 by the first sharing processing even in a case in which the device driver 802 cannot be modified in accordance with upgrading of the host OS 102 and the guest OS 105.

In this way, with the controller 800 according to the fourth embodiment, the control data can be shared between the controller process unit 1001 and the guest process group 106 irrespective of whether the storage region 502*a* for the host OS as an example of the PCI device memory accessible via the device driver 802.

Fifth Embodiment

The present embodiment is an example in which the hardware includes a storage unit that stores a candidate of the hardware allocation data, and the controller process unit acquires the hardware allocation data from the external device, compares the candidate of the hardware allocation data stored in the storage unit with the acquired hardware allocation data to detect an anomaly (error) in the acquired hardware allocation data, and notifies a detection result thereof. In the following description, redundant description about a configuration similar to that of the first embodiment will not be repeated.

Figure 13:
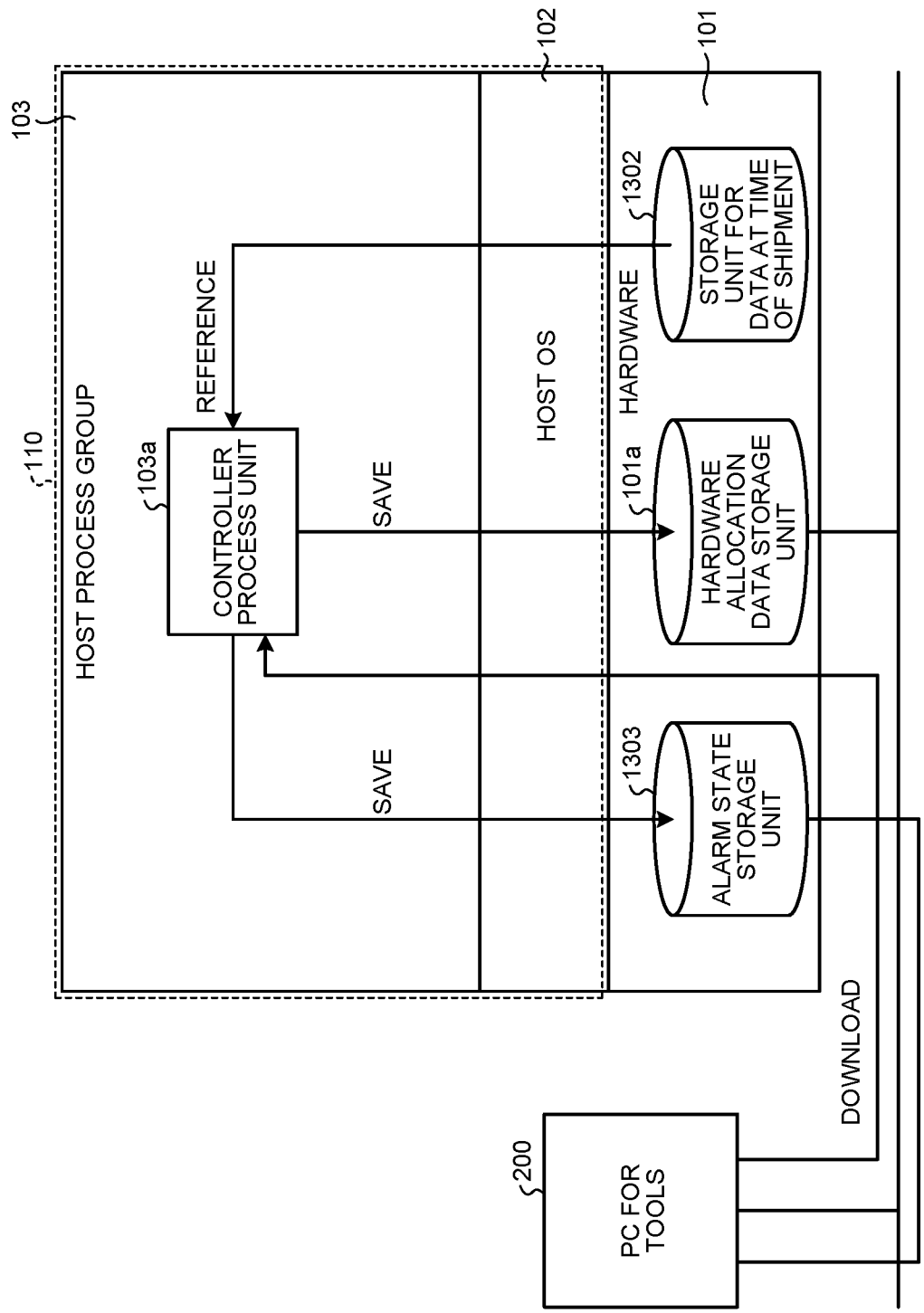
FIG. 13 is a diagram for explaining an example of processing of detecting an anomaly in hardware allocation data executed by a controller of a control system according to a fifth embodiment.

FIG. 13 is a diagram for explaining an example of processing of detecting an anomaly in the hardware allocation data executed by the controller of the control system according to the fifth embodiment. In the present embodiment, the controller process unit 103*a* of the host process group 103 saves the candidate of the hardware allocation data set in advance (hereinafter, referred to as data at the time of shipment) in a storage unit 1302 for data at the time of shipment as a nonvolatile storage unit such as a hard disk drive (HDD) included in the hardware 101. In this case, the data at the time of shipment indicates a condition (for example, at least one CPU core is allocated to the host OS 102) or a value that may be taken by the hardware allocation data. In a case of downloading the hardware allocation data from the PC for tools 200, the controller process unit 103*a* compares the downloaded hardware allocation data with the data at the time of shipment. In a case in which the downloaded hardware allocation data does not match the data at the time of shipment, the controller process unit 103*a* detects an anomaly in the downloaded hardware allocation data. For example, in a case in which an actual configuration of the hardware 101 is different from a hardware configuration indicated by the hardware allocation data, the controller process unit 103*a* detects an anomaly in the hardware allocation data.

In a case in which an invalid value is erroneously set to the hardware allocation data, and the controller process unit 103*a* and the guest process group 106 refer to the hardware allocation data to execute control processing, an operation of the control system may be seriously affected. Thus, at the time of shipping the controller 100, a value that may be taken by the hardware allocation data is saved for the controller 100 in advance as data at the time of shipment. The controller process unit 103*a* refers to the data at the time of shipment, and detects an anomaly in the downloaded hardware allocation data. In a case in which an anomaly is detected in the downloaded hardware allocation data, the controller process unit 103*a* does not start up the guest initialization process unit 103*b*, and prevents the guest process group 106 from using the hardware 101 allocated to the guest OS 105 in accordance with the hardware allocation data, thereby denying execution of the control processing.

Specifically, at the time of acquiring (downloading) the hardware allocation data from the PC for tools 200, the controller process unit 103*a* compares the hardware allocation data with the data at the time of shipment. In a case in which the downloaded hardware allocation data does not match the data at the time of shipment, the controller process unit 103*a* detects an alarm state (anomaly or normal) of the hardware allocation data. The controller process unit 103*a* saves a detection result of the alarm state in an alarm state storage unit 1303 as a nonvolatile storage unit such as a hard disk drive (HDD) included in the hardware 101. Due to this, a user of the controller 100 checks the alarm state stored in the alarm state storage unit 1303, and does not start up the guest initialization process unit 103*b* in a case in which there is an anomaly in the hardware allocation data. The controller process unit 103*a* may notify an administrator of the control system of the detection result of the alarm state by transmitting the detection result of the alarm state to the PC for tools 200.

In this way, with the controller 100 according to the fifth embodiment, the hardware 101 can be prevented from being erroneously allocated to the host OS 102 and the guest OS 105 in accordance with the hardware allocation data in a case in which there is an anomaly in the hardware allocation data downloaded from the PC for tools 200, so that the control system can be prevented from erroneously operating because of the hardware allocation data that is erroneously set.

As described above, according to the first to the fifth embodiments, the setting of the virtual machine 104 can be managed in accordance with the update of the hardware of the external device even in a case of integrating the external device such as an HMI or another controller is integrated into the controller 100.

The computer program executed by the controllers 100 and 800 in the present embodiment is embedded and provided in a read only memory (ROM) or the like. The computer program executed by the controllers 100 and 800 in the present embodiment may be recorded and provided in a computer-readable recording medium such as a CD-ROM, a flexible disk (FD), a CD-R, and a digital versatile disc (DVD), as an installable or executable file.

The computer program executed by the controllers 100 and 800 in the present embodiment may be stored in a computer connected to a network such as the Internet and provided by being downloaded via the network. Furthermore, the computer program executed by the controllers 100 and 800 in the present embodiment may be provided or distributed via a network such as the Internet.

The computer program executed by the controllers 100 and 800 in the present embodiment has a module configuration including the components described above (the host OS 102, the host process group 103, the virtual machine 104, the guest OS 105, and the guest process group 106). As actual hardware, the components described above are loaded into a main storage device when a central processing unit (CPU) reads out the computer program from the ROM to be executed, and the host OS 102, the host process group 103, the virtual machine 104, the guest OS 105, and the guest process group 106 are generated on the main storage device.

The embodiments of the present invention have been described above. However, these embodiments are merely examples, and do not intend to limit the scope of the invention. These novel embodiments can be implemented in various other forms, and can be variously omitted, replaced, and modified without departing from the gist of the present invention. These embodiments and the modification thereof are encompassed by the scope and the gist of the present invention, and also encompassed by the invention described in Claims and an equivalent thereof.

What is claimed is:

1. A control device comprising:
hardware that includes a memory and a processor, the memory being a memory which stores a host operating system (OS), a virtual machine, a guest OS, a guest process, and a controller process, the processor being a processor which executes the host OS, the virtual machine, the guest OS, the guest process, and the controller process, wherein
the virtual machine is implemented on the host OS,
the guest OS is configured to operates on the virtual machine,
the guest process is configured to be operated by the guest OS, the guest process executing control processing for an external appliance to be controlled using hardware that is allocated to the guest OS in accordance with hardware allocation data indicating the hardware to be allocated to each of the host OS and the guest OS,
the controller process is configured to be operated by the host OS, the controller process executing control processing for the external appliance to be controlled using hardware that is allocated to the host OS in accordance with the hardware allocation data,
the hardware includes a shared memory including a storage region for the host OS allocated to the host OS and a storage region for the guest OS that is different from the storage region for the host OS and allocated to the guest OS,
the controller process saves control data to be transmitted to the external appliance to be controlled in the storage region for the host OS, and transmits/receives the control data to/from the guest process, and
the guest process unit saves the control data in the storage region for the guest OS, and transmits/receives the control data to/from the controller process.

2. The control device according to claim 1, wherein
the hardware includes a device memory allocated to the host OS,
the controller process saves the control data in the device memory, and
the host OS and the guest OS each include a driver used for accessing the device memory by the guest process.

3. The control device according to claim 2, wherein
the controller process and the guest process transmit/receive the control data in accordance with communication parameters required for communication between the host OS and the guest OS, and
the communication parameters include at least one of:
a port number of a port used for communication by the host OS and the guest OS;
an IP address allocated to the host OS;
an IP address allocated to the guest OS;
a subnet mask of the IP address of each of the host OS and the guest OS;
a scanning cycle for transmitting/receiving the control data between the controller process and the guest process;
a head address of a storage region for the control data to be transmitted from the controller process to the guest process among storage regions included in the storage region for the host OS;
a size of the control data to be transmitted from the controller process to the guest process;
a head address of a storage region for the control data to be transmitted from the guest process to the controller process among storage regions included in the storage region for the guest OS; and
a size of the control data to be transmitted from the guest process to the controller process.

4. The control device according to claim 3, wherein
the communication parameters include transport information indicating whether the control data is shared between the controller process and the guest process through transmission/reception of the control data,
in a case in which the transport information indicates that the control data is shared between the controller process and the guest process through transmission/reception of the control data, the controller process and the guest process transmit/receive the control data to/from each other, and
in a case in which the transport information indicates that the control data is not shared between the controller process and the guest process through transmission/reception of the control data, the guest process accesses the device memory via the driver.

5. The control device according to claim 1, wherein
the hardware includes a storage configured to store a candidate of the hardware allocation data,
and the controller process acquires the hardware allocation data from an external device, and compares the candidate of the hardware allocation data stored in the storage with the acquired hardware allocation data to detect an error in the acquired hardware allocation data.

* * * * *